United States Patent [19]
Kawashima et al.

[11] Patent Number: 5,230,668
[45] Date of Patent: Jul. 27, 1993

[54] V-RIBBED BELT

[75] Inventors: Masahiko Kawashima; Kyoichi Mishima; Koji Kitahama, all of Kobe, Japan

[73] Assignee: Mitsuboshi Belting Ltd., Nagata, Japan

[21] Appl. No.: 865,969

[22] Filed: Apr. 9, 1992

[30] Foreign Application Priority Data

Apr. 15, 1991 [JP] Japan .............................. 3-034297[U]

[51] Int. Cl.$^5$ ................................................ F16G 5/00
[52] U.S. Cl. ...................................................... 474/263
[58] Field of Search ................ 474/237, 238, 260–265, 474/268

[56] References Cited

U.S. PATENT DOCUMENTS 4,177,688 12/1979 Howerton et al. ............. 474/263 X

FOREIGN PATENT DOCUMENTS 0009389 4/1980 European Pat. Off. ............ 474/263

Primary Examiner—Thuy M. Bui
Attorney, Agent, or Firm—Wood, Phillips, VanSanten, Hoffman & Ertel

[57] ABSTRACT

A power transmission belt having an inside surface and an outside surface. The power transmission belt has: a compression section defining a plurality of laterally spaced, longitudinally extending ribs made at least partially of rubber; a plurality of discrete, laterally extending reinforcing fibers in the ribs; a tension section outside of the compression section and defined at least partially by a rubber layer; and a plurality of discrete, laterally extending reinforcing fibers in the rubber layer of the tension section. The length of the reinforcing fibers in the rubber layer of the tension section is greater than the length of the reinforcing fibers in the ribs.

26 Claims, 1 Drawing Sheet

V-RIBBED BELT

BACKGROUND OF THE INVENTION

1. Field of the Invention

This invention relates to power transmission belts and, more particularly, to a belt with longitudinally extending, laterally spaced ribs and discrete, laterally directed reinforcing fibers in both the tension and compression sections of the belt in which a) cracking between adjacent ribs is minimized without significantly altering the flexibility of the belt and b) a high friction drive surface is provided on the back/outside surface of the belt.

2. Background Art

Power transmission belts having a plurality of laterally spaced, longitudinally extending, V-shaped ribs have a wide range of applications in many diverse fields. These belts, commonly referred as V-ribbed belts, are used, for example, in the automotive industry, on agricultural implements, on domestic electrical implements, and further on general purpose equipment.

V-ribbed belts have a number of desirable features. Because the V-ribbed belt is normally thinner than a conventional V-belt, it is highly flexible and thus capable of wrapping around pulleys of relatively small diameter. V-ribbed belts are commonly used in what are known as serpentine drive systems on automobile engines. The belt is wrapped in a circuitous path so that engine components are driven by both the inside and outside surfaces of the V-ribbed belt. The flexibility of the belt allows the various components driven thereby to be compactly situated. This is particularly desirable in an automobile engine compartment in which space is at a premium.

The V-ribbed belt is also desirable for its energy saving capability. This is due in part to the highly flexible nature of the V-ribbed belt.

A still further advantage of the V-ribbed belt is that the individual ribs do not penetrate the grooves in a cooperating pulley as deeply as those in a conventional V-belt drive system. By minimizing the friction between the belt and pulley as the belt engages and disengages from the pulley, abrasive wear on the belt is reduced over conventional V-belts. Further, less tension is required to be applied to the belt during operation. The advantages of this are both a savings in energy during operation and prolongation of the belt life.

All of the above features make the V-ribbed belt desirable in the wide range of industries in which it is currently being used.

The V-ribbed belt, however, does have a number of drawbacks. One problem is encountered with the V-ribbed belt in a serpentine drive system in which both the inside and outside surfaces of the belt are used for driving purposes. The outside surface of the belt, which is typically flat, i.e. without ribs, facially engages an annular surface on a pulley to be driven by the belt. To reinforce the outside surface of the belt, typically the exposed outer surface is defined by a rubber-coated fabric. However, the fabric, while reinforcing the outside of the belt, reduces the coefficient of friction on the outside belt driving surface and results in the belt slipping relative to the pulley, which thereby reduces the power transmission capability of the back/outside surface of the belt.

One solution to this problem is to define the exposed outer surface by a rubber layer. This improves the power transmission capability of the back/outside surface of the belt. However, the unreinforced outside rubber layer is prone to cracking, particularly where it laterally coincides with the troughs between adjacent ribs, where the belt is the thinnest. A crack that originates in the rubber layer may propagate freely. There is a resulting tendency of the ribs to break away from each other at the relatively thin portion of the belt between ribs.

In addition to the above problems noted for V-ribbed belts using a rubber-coated fabric in the back/outside surface thereof, such belts further require multiple components, which adds to the cost of manufacture. For example, a conventional belt made according to the above may require four different components: 1) rubber coated fabric; 2) load-carrying cords; 3) reinforcing fibers for the compression section; and 4) at least one rubber composition for the tension section, compression section and load-carrying section defining the neutral belt axis.

There is yet another problem resulting from the use of a rubber-coated fabric on the back/outside surface of the belt. The rubber-coated fabric requires the formation of a joint to produce an endless band from the rubber-coated fabric. In addition to the difficulty in producing a high integrity joint, the joint itself may produce a localized variation in the belt thickness. This variation may induce vibrations to the system and/or may result in inconsistent drive characteristics. Further, the belt is prone to failure at the joint, which could make the belt unusable.

SUMMARY OF THE INVENTION

The present invention is specifically directed to overcoming the above-enumerated problems in a novel and simple manner.

According to the invention, a power transmission belt having an inside surface and an outside surface is provided. The power transmission belt has: a compression section defining a plurality of laterally spaced, longitudinally extending ribs made at least partially of rubber; a plurality of discrete, laterally extending reinforcing fibers in the ribs; a tension section outside of the compression section and defined at least partially by a rubber layer; and a plurality of discrete, laterally extending reinforcing fibers in the rubber layer of the tension section. The length of the reinforcing fibers in the rubber layer of the tension section is greater than the length of the reinforcing fibers in the ribs.

According to the invention, the reinforcing fibers in the rubber layer of the tension section reinforce the rubber to minimize cracking, as between adjacent ribs, without significantly altering the flexibility of the belt. Preferably, the rubber layer in the tension section defines the exposed outside surface of the belt which, in certain systems, serves as a pulley-engaging drive surface. The fibers in the rubber layer in the tension section do not significantly alter the drive characteristics of the back/outside surface of the belt.

In one form of the invention, the reinforcing fibers in the rubber layer of the tension section are at least 1.5 times as long as the reinforcing fibers in the ribs. In one form, the length of the reinforcing fibers in the rubber layer of the tension section is in the range of 5 to 20 mm and more preferably in the range of 10 to 15 mm. The reinforcing fibers in the ribs have a length preferably in the range of 3–10 mm.

With the reinforcing fibers in the rubber layer of the tension section, the tension section can be made relatively thin so as to provide a highly flexible belt that is not prone to cracking, even at its thinnest points between adjacent ribs. The fibers also prevent propagation of any crack that might develop in the belt. In one form, the rubber layer of the tension section has a thickness of between 0.3 and 5.0 mm and preferably is in the range of 0.5 mm and 2.0 mm.

To optimize both reinforcement of and driving capability for the back/outside surface of the rubber layer in the tension section, the reinforcing fibers are distributed in the rubber layer in the tension section in the amount of 1 to 50 weight parts of reinforcing fiber to 100 weight parts of rubber.

In one form, the reinforcing fibers in the ribs are mixed in the amount of 5 to 30 weight parts of reinforcing fiber to 100 weight parts of rubber.

In one form, the reinforcing fibers in the rubber layer of the tension section are made at least partially of synthetic fiber yarns that are at least one of nylon, vinylon, polyester and aromatic polyamide. The invention also contemplates the reinforcing fibers in the rubber layer of the tension section to be made at least partially of a mixture of yarns that are made of natural fiber yarn that is one of cotton and pulp, etc., mixed in a predetermined ratio with synthetic fiber yarns, as described above.

In one form, a cushion rubber layer is provided and has load-carrying cords embedded therein to define a neutral axis for the belt. The load-carrying cords are preferably made from at least one of polyester, nylon and aromatic polyamide.

In one form, the rubber in at least one of a) the ribs, b) the rubber layer in the tension section, and c) the adhesive rubber layer, is at least one of NR, SBR, CR, and HNBR. In a preferred form, the rubber making up at least two of a) the ribs, b) the rubber layer in the tension section, and c) the cushion layer is the same.

In one form of the invention, there are no laterally extending reinforcing fibers in the cushion rubber layer.

With the present invention, not only are belt performance and life improved, but manufacturing is facilitated by reducing the number of belt components. In one form of the invention, the same rubber can be used for the ribs, cushion rubber layer and the rubber layer in the tension section. The reinforcing fibers in the rubber layer in the tension section and ribs can be made from the same material. The only other required component is the cord structure used to define the longitudinally extending, load-carrying cords. As a result of simplifying manufacturing, the costs attendant thereto are reduced.

Further, by excluding the rubber-coated fabric layer, in addition to the other advantages noted above, the joint at the free ends of the fabric, normally required to produce a conventional belt, can be eliminated.

Further, by having the tension rubber layer with reinforcing fibers therein, the exposed back/outside surface of the belt can be ground and polished to a very uniform surface so that the belt thickness does not deviate over the entire belt length, resulting in a consistently high quality belt. Smooth and consistent operation of the belt result. Also, the possibility of failure of the fabric joint is eliminated.

DETAILED DESCRIPTION OF THE DRAWINGS

Figure 1:
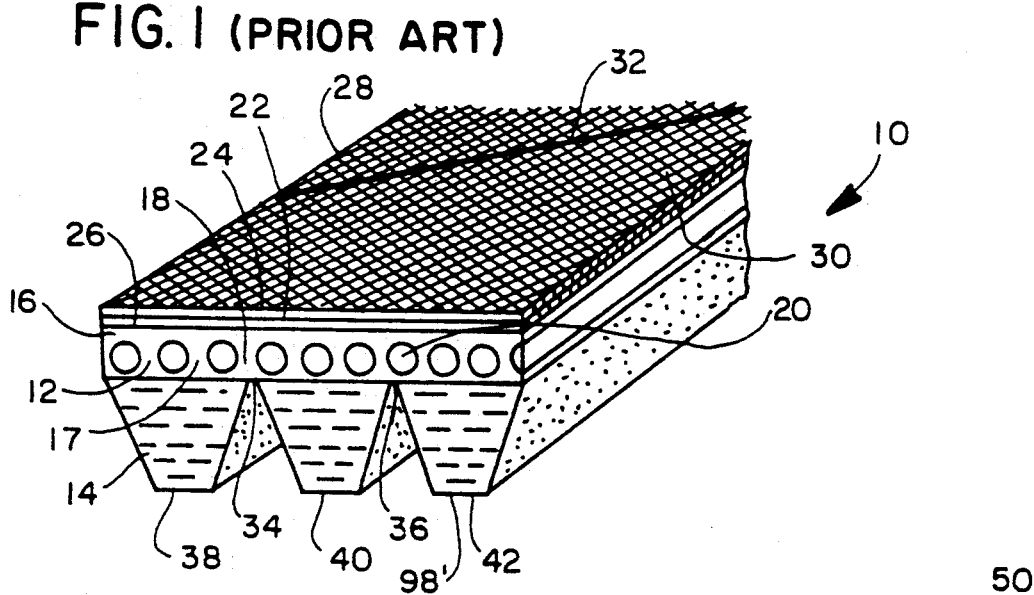
FIG. 1 is a cross-sectional, perspective view of a section of a V-ribbed belt of the prior art and utilizing rubber-coated fabric to define a back/outside driving surface therefor.

In FIG. 1, a prior art, V-ribbed belt is shown at 10. The belt 10 has a load-carrying section 12, defining a neutral axis for the belt, a compression section 14, and a tension section 16. A single rubber layer 18 defines a cushion layer 17, in which a plurality of longitudinally extending, load-carrying cords 20 are embedded. The rubber layer 18 is contiguous with the tension section 16 and compression section 14. Two rubber-coated fabric layers 22, 24 are adhered to the outer surface 26 of the rubber layer 18. Only one such layer 22, 24 is required. The outer fabric layer 24 defines the exposed back/outside surface 28 of the belt 10 which is directly engageable with a pulley with the belt 10 used as in a serpentine drive system. Alternatively, the layer 24 can be made entirely of rubber without any fabric reinforcement.

The rubber coated fabric layers 22, 24, by reason of incorporation of the fabric 30 therein, become relatively rigid, which detracts from the overall flexibility of the belt 10. At the same time, the exposed fabric 30 reduces the coefficient of friction of the outside surface 28 of the outer layer 24 to compromise its drive capabilities.

A still further problem with the belt 10 in FIG. 1 is that the fabric 30 must be joined at a seam/joint 32 to define an endless fabric band. This seam/joint 32 can be made by any of a number of techniques known to those skilled in the art. However, regardless of the technique used to define the seam/joint 32, there is a possibility that there will be a variation in the thickness of the layers 22, 24 at the seam 32, particularly when the free ends of the fabric 30 are overlapped. Among other potential problems resulting from this localized thickening, there is the potential for rough operation of the belt, which may induce vibrations to the system.

A further problem with the seam 32 is that it is normally a weakened portion of the fabric 30. If the seam 32 fails, the fabric layer 24 could come apart and render the belt unusable.

As previously noted, elimination of the fabric 30 from the rubber in the layers 22, 24, while providing a high coefficient of friction for the back/outside drive surface 28, may result in cracking of the belt above the troughs 34, 36, defined between adjacent ribs 38, 40 and 40, 42, respectively. As can be seen, the belt 10 has a relatively thin dimension in lateral coincidence with the troughs 34, 36. Once a crack starts in the layers 22, 24, there is little to prevent it from propagating.

Figure 2:
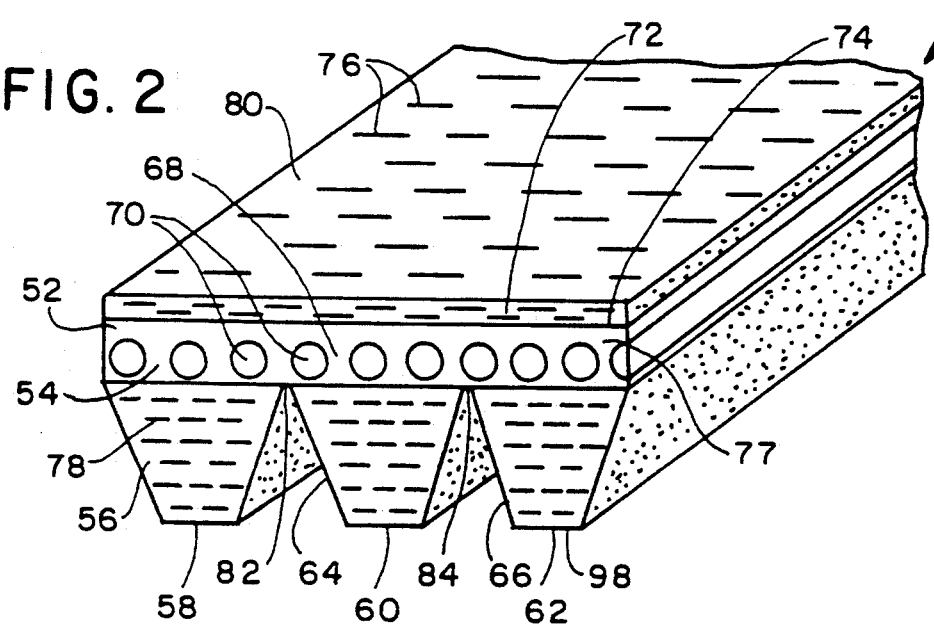
FIG. 2 is a cross-sectional, perspective view of a section of a V-ribbed belt according to the present invention.

A preferred form of the inventive belt is shown at 50 in FIG. 2. The belt 50 is a V-ribbed belt having a tension section 52, a load-carrying section 54, and a compression section 56. The belt 50 has a plurality of longitudinally extending, laterally spaced, V-shaped ribs 58, 60, 62, with V-shaped grooves 64, 66 defined respectively between the ribs 58, 60 and ribs 60, 62 for reception of cooperating pulley teeth (not shown).

The load-carrying section 54 has a cushion rubber layer 68 within which a plurality of longitudinally extending, load-carrying cords 70 are embedded. The cords 70 are made of low elongation, high strength material. In a preferred form, the cords 70 are made of at least one of polyester, nylon and aromatic polyamide fiber. The cushion rubber layer 68, in which the load-carrying cords 70 are embedded, is preferably made either solely from NR, SBR, CR, and HNBR, etc., or a mixture thereof.

According to the invention, a rubber layer 72 is adhered in the tension section of the belt 50 to the outer surface 74 of a rubber layer 77, defining the cushion rubber layer 68, which rubber layer 68 is contiguous with both the tension section 52 and compression section 56 of the belt 50. Short, discrete, reinforcing fibers 76 are mixed in the rubber layer 72 and oriented to extend substantially laterally of the belt 50.

Short, discrete, reinforcing fibers 78 are also embedded in the rubber in the compression section 56 and, in the embodiment shown, are provided only in the ribs 58, 60 and 62. The fibers 78 may be made from a material that is the same as the material making up the fibers 76.

In a preferred form, the rubber defining the layer 72 is the same as that making up the rubber layer 77. The ribs 58, 60, 62 can also be made from the same rubber material.

According to the invention, reinforcing fibers 76 in the rubber layer 72 are dispersed in the amount of 1 to 50 weight parts of fiber to 100 weight parts of rubber. The fiber 76 may be made solely from synthetic fiber yarns made of nylon, vinylon, polyester, aromatic polyamide, etc., or a mixture of yarns that are made of natural fiber that is one of cotton, pulp, etc., mixed in a predetermined ratio with the synthetic fiber yarns.

Preferably, the reinforcing fibers 76 are cut to a length of 5 to 20 mm and are more preferably in the range of 10 to 15 mm. In any event, the fibers 76 are cut to be at least 1.5 times as long as the length of the reinforcing fibers 78 in the ribs 58, 60, 62.

The reinforcing fibers 78 are preferably made to have a length between 3 and 10 mm and are included in an amount of 5 to 30 weight parts of fibers 78 to 100 weight parts of rubber in the ribs 58, 60, 62.

The inclusion of the reinforcing fibers 76 in the layer 72 only minimally diminishes the coefficient of friction of the pulley-engaging outside surface 80 of the belt 50. At the same time, the reinforcing fibers 76 allow the thickness of the rubber layer 72 to be relatively small so as not to detract from the overall flexibility of the belt 50, without significantly compromising the belt integrity. More particularly, the rubber layer 72 has a preferred thickness in the range of 0.3 to 5.0 mm, and more preferably 0.5 to 2.0 mm.

The length of the fibers 76 is sufficient to prevent cracking, particularly at the vertical intersection of the layer 72 with the troughs 82, 84, defined respectively between adjacent teeth 58, 60 and 60, 62. These regions may be highly stressed and thus are particularly prone to cracking. Stress concentration over the troughs 82, 84 may result from irregularities in cooperating pulleys or by reason of misalignment of cooperating pulleys about which the belt 50 is trained. A foreign object in a pulley groove may likewise cause the belt 50 to be highly stressed over the troughs 82, 84. Improved resistance to cracking, which might ultimately result in separation of the ribs 58, 60, 62, each from the other, results with the present invention. Once a crack is developed, the fibers 76 arrest crack propagation.

If the thickness of the rubber layer 72 is less than 0.3 mm, it has been determined that the layer 72 is prone to tearing, particularly in the region above the troughs 82, 84. When the thickness of the layer 72 is greater than 5.0 mm, the overall belt thickness increases to the point that the desired belt flexibility is lost.

It has been found that if the length of the reinforcing fibers 76 is less than 5 mm, no significant effect is realized in preventing longitudinal tearing of the layer 72 over the troughs 82, 84. On the other hand, reinforcing fibers 76 having lengths of 20 mm and over do not disperse uniformly in the rubber layer 72. That is, the fibers tend to bend and become randomly oriented which results in little resistance to cracking of the layer 72. A crack in layer 72 may propagate through the layer 77 and result in separation of the ribs 58, 60, 62, each from the other.

To demonstrate the effectiveness of the device, tests were conducted comparing variations of the belt 50, according to the invention, with conventional belts 10, as in FIG. 1.

Testing Resistance Test

Inventive Belt

The inventive belt 50 utilized in this test was a K-type belt, as shown in FIG. 2, with four ribs (4 PK). 15 parts by weight of short staple reinforcing fibers 76 made of nylon yarn were mixed per 100 parts by weight of rubber in the tension rubber layer 72 of the belt 50. The belt 50 was tested using two different lengths of reinforcing fibers —6.0 mm and 12.0 mm. The rubber layer 72 for each of the inventive test belts was 0.5 mm thick.

A second test was conducted wherein the reinforcing fibers were made from aromatic polyamide yarns, rather than nylon yarns. 5 weight parts of reinforcing fiber were mixed for each 100 weight parts of rubber. Two lengths of reinforcing fiber were also tested —3.0 mm and 6.0 mm.

Conventional Belt

The conventional belts 10 tested were the same as that 10, shown in FIG. 1. The layer 24, in one form, had no reinforcing fibers therein and utilized a rubber-coated fabric, while the other belt 10 had an unreinforced rubber layer 24.

Test System

The vertical tearing resistance between the V-ribs on each belt 10, 50 was measured by a tensile testing machine having 50 mm/min of pulling speed with two ribs as a boundary.

The results of these tests are shown in Tables 1 and 2.

TABLE 1

|  | Inventive Belt | | Conventional Belt | |
| --- | --- | --- | --- | --- |
| Length of Nylon Yarns (Reinforcing Fibers) | 6 mm | 12 mm | None | Fabric |
| Vertical Tearing Resistance (kgf) | 3.8 | 4.7 | 3.0 | 5.7 |
| Back Surface Transmission Capacity (ps) | 3.1 | 3.1 | 3.3 | 1.2 |

TABLE 2

| | Inventive Belt | Conventional Belt | | |
|---|---|---|---|---|
| Length of Aromatic Polyamide Yarns (Reinforcing Fibers) | 6 mm | 3 mm | None | Fabric |
| Vertical Tearing Resistance (kgf) | 4.5 | 3.2 | 3.0 | 5.7 |
| Back Surface Transmission Capacity (ps) | 3.1 | 3.1 | 3.3 | 1.2 |

A review of the results in Tables 1 and 2 demonstrates that the tearing resistance of the inventive belts 50 is 1.2 to 1.6 times as large as that for conventional belts using rubber alone in the outside layer 24 without reinforcing fibers. The inventive belts 50 had approximately 0.7 to 0.8 times the longitudinal tearing resistance compared to the conventional belts 10 using the rubber coated fabric on the outside layer 24.

It was found that the tearing resistance of the inventive belt was improved by increasing the length of the reinforcing fibers 76 up to a certain point.

Back Surface Power Transmission Test

Test System

Figure 3:
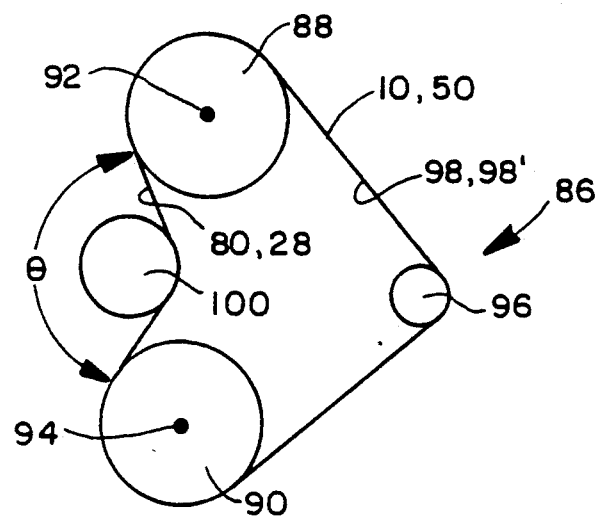
FIG. 3 is a schematic, side elevation view of a horsepower testing machine for power transmission belts.

The belts were tested on a device, shown schematically at 86 in FIG. 3. The testing device 86 consists of an idler pulley 88 and a drive pulley 90, rotatable about parallel axes 92, 94. The pulleys 88, 90 both had the same diameter of 120 mm. A tensioning pulley 96, having a 45 mm diameter, was borne against the inside surface 98, 98' of the test belts 10, 50. A driven pulley 100, having an 85 mm diameter, was utilized to drive the back/outside surfaces 80, 28 of the belt 10, 50. The system was arranged so that the bending angle Θ around the driven pulley 100 was equal to 120°.

The system was operated at room temperature with no load applied to the idler pulley 88 and tensioning pulley 96. The driven pulley 100 was operated at 4900 rpm with 15 kgf/3 ribs of belt tension.

The load on the driven pulley 100 was varied and noted at the time of 2% slippage for each belt 10, 50.

Conventional Belt

The same belts 10 were used in this test as in the tearing resistance test, described above.

Inventive Belt

The V-ribbed belt 50 had three ribs and a length of 1100 mm (3PK1100) and was otherwise constructed the same as the belts shown in Tables 1 and 2.

The test results are shown in Tables 1 and 2. From the results, it can be seen that substantially the same back surface force transmission capability of the inventive belt 50 is realized using the reinforcing fibers in the back surface as the conventional belt 10 using a back/outside layer 24 made of rubber with no short staple reinforcing fibers therein. The back surface transmission force of the inventive belt 50 was 2.6 times as large as that of the conventional belt 10 using rubber coated fabric.

The foregoing disclosure of specific embodiments is intended to be illustrative of the broad concepts comprehended by the invention.

We claim:

1. A power transmission belt having an inside surface and an outside surface, said power transmission belt comprising:
   a compression section defining a plurality of laterally spaced, longitudinally extending ribs made at least partially from rubber;
   a plurality of discrete, laterally extending reinforcing fibers in said ribs;
   a tension section outside of said compression section and defined at least partially by a rubber layer; and
   a plurality of discrete, laterally extending reinforcing fibers in the rubber layer of said tension section,
   wherein the length of the reinforcing fibers in the rubber layer of the tension section is greater than the length of the reinforcing fibers in the ribs.

2. The power transmission belt according to claim 1 wherein the reinforcing fibers in the rubber layer of the tension section are at least 1.5 times as long as the reinforcing fibers in the ribs.

3. The power transmission belt according to claim 1 wherein the length of the reinforcing fibers in the rubber layer of the tension section is in the range of 5 to 20 mm.

4. The power transmission belt according to claim 2 wherein the length of the reinforcing fibers in the ribs is in the range of 5 to 10 mm.

5. The power transmission belt according to claim 1 wherein the rubber layer of the tension section has a thickness between 0.3 and 5.0 mm.

6. The power transmission belt according to claim 1 wherein the reinforcing fibers are distributed in the rubber layer in the tension section in the amount of 1 to 50 weight parts of reinforcing fiber to 100 weight parts of rubber.

7. The power transmission belt according to claim 6 wherein the reinforcing fibers in the rubber layer of the tension section are made at least partially of synthetic fibers that are at least one of nylon, vinylon, polyester and aromatic polyamide.

8. The power transmission belt according to claim 7 wherein the reinforcing fibers in the rubber layer of the tension section are made at least partially of fiber yarns that are at least partially a mixture of natural fibers, that are one of cotton and pulp, in a predetermined ratio with the synthetic fibers.

9. The power transmission belt according to claim 2 wherein the length of the reinforcing fibers in the rubber layer of the tension section is 10 to 15 mm.

10. The power transmission belt according to claim 1 wherein the rubber layer of the tension section defines the exposed outside surface of the power transmission belt.

11. The power transmission belt according to claim 1 wherein there is a cushion rubber layer having load-carrying cords embedded therein and defining a neutral axis for the belt, said load-carrying cords being made of at least one of polyester, nylon, and aromatic polyamide.

12. The power transmission belt according to claim 11 wherein the rubber in one of a) the ribs, b) the rubber layer in the tension section and c) the cushion rubber layer is at least one of NR, SBR and CR.

13. The power transmission belt according to claim 12 wherein the rubber making up at least two of the a) rubber layer in the tension section, b) ribs, and c) cushion rubber layer is the same.

14. The power transmission belt according to claim 1 wherein the rubber layer of the tension section has a thickness of between 0.5 mm and 2.0 mm.

15. The power transmission belt according to claim 1 wherein the reinforcing fibers in the ribs have a length in the range of 3 to 10 mm.

16. The power transmission belt according to claim 1 wherein the reinforcing fibers in the ribs are mixed in the amount of 5 to 30 weight parts of reinforcing fibers to 100 weight parts of rubber.

17. The power transmission belt according to claim 1 wherein the reinforcing fibers in the rubber layer and in the ribs are made from the same material.

18. A power transmission belt having an inside surface and an outside surface, said power transmission belt comprising:
  a compression section defining a plurality of laterally spaced, longitudinally extending ribs made at least partially of rubber;
  a tension section outside of said compression section and defined at least partially by a rubber layer;
  a load-carrying section between the rubber layer in the tension section and the ribs and having a cushion rubber layer with a plurality of longitudinally extending load-carrying cords embedded therein which define the neutral axis of the belt; and
  a plurality of discrete, laterally extending reinforcing fibers in each of the ribs and rubber layer in the tension section, wherein the reinforcing fibers in the rubber layer in the tension section have a length that is at least 1.5 times the length of the reinforcing fibers in the ribs.

19. The power transmission belt according to claim 18 wherein there are no laterally extending reinforcing fibers in the cushion rubber layer.

20. The power transmission belt according to claim 18 wherein the length of the reinforcing fibers in the rubber layer in the tension section is in the range of 5 to 20 mm.

21. The power transmission belt according to claim 20 wherein the tension section has a thickness of between 0.3 and 5.0 mm.

22. The power transmission belt according to claim 21 wherein the reinforcing fibers are distributed in the rubber layer in the tension section in the amount of 1 to 50 weight parts of reinforcing fiber to 100 weight parts of rubber, and the reinforcing fibers in the ribs are distributed in the ribs in the amount of 5 to 30 weight parts of reinforcing fiber to 100 weight parts of rubber.

23. The power transmission belt according to claim 22 wherein the rubber layer of the tension section has a thickness of between 0.5 mm and 2.0 mm.

24. The power transmission belt according to claim 23 wherein the rubber layer of the tension section defines the exposed outside surface of the power transmission belt.

25. The power transmission belt according to claim 24 wherein the length of the reinforcing fibers in the rubber layer of the tension section is 10 to 15 mm.

26. The power transmission belt according to claim 18 wherein the length of the reinforcing fibers in the ribs is in the range of 3 to 10 mm.

* * * * *